United States Patent [19]

Yamada

[11] Patent Number: 4,866,654
[45] Date of Patent: Sep. 12, 1989

[54] DIGITAL MULTIPLYING CIRCUIT

[75] Inventor: Yasuhiro Yamada, Fussa, Japan

[73] Assignee: Hoya Corporation, Tokyo, Japan

[21] Appl. No.: 704,635

[22] Filed: Feb. 22, 1985

[30] Foreign Application Priority Data

Feb. 24, 1984 [JP] Japan ................... 59-34752

[51] Int. Cl.⁴ .................. G06F 7/52; G06F 11/10
[52] U.S. Cl. .................. 364/754; 364/757; 371/37.1
[58] Field of Search ........... 364/754, 757; 371/37, 371/39, 40

[56] References Cited

U.S. PATENT DOCUMENTS

| | | | |
|---|---|---|---|
| 3,668,632 | 6/1972 | Oldham, III | 371/37 |
| 4,037,093 | 7/1977 | Gregg et al. | 364/757 |
| 4,162,480 | 7/1979 | Berlekamp | 364/200 |
| 4,251,875 | 2/1981 | Marver et al. | 364/754 |
| 4,584,686 | 4/1986 | Fritze | 371/37 |
| 4,586,183 | 4/1986 | Wilkinson | 371/39 |

OTHER PUBLICATIONS

Wang et al., "VLSI Architectures for Computing Multiplications and Inverses in GF($2^m$)", *IEEE Trans. on Computers*, vol. C-34, #8, pp. 709-716, Aug. 85.

*Primary Examiner*—Gary V. Harkcom
*Assistant Examiner*—Dale M. Shaw
*Attorney, Agent, or Firm*—Roberts, Spiecens & Cohen

[57] ABSTRACT

A digital multiplying circuit comprises an input terminal serially applied with input vectors which are elements of a finite field GF($2^h$), where h is a natural number, an output terminal for producing a signal obtained by multiplying a desired multiplying constant to one input vector, and h multiplying circuit parts each comprising a multiplier and a data selector for selectively producing an input or output signal of the multiplier responsive to an external selection signal. The h multiplying circuit parts are coupled in series between the input terminal and the output terminal, and an r-th multiplier among the multipliers with the h multiplying circuit parts has a multiplying constant $\alpha^z$, where r=1, 2, ..., h, $\alpha$ is a primitive element of the finite field GF($2^h$) and $z=2^{(r-1)}$. At least one of the data selectors within the h multiplying circuit parts comprises a control terminal and is forced to produce a zero output signal responsive to an external control signal applied to the control terminal.

4 Claims, 3 Drawing Sheets

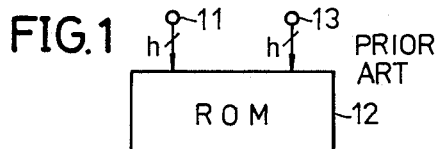
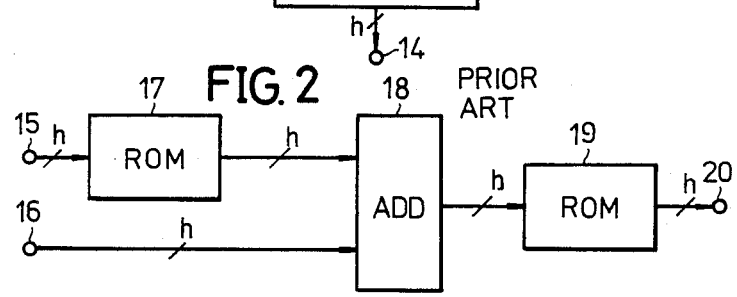
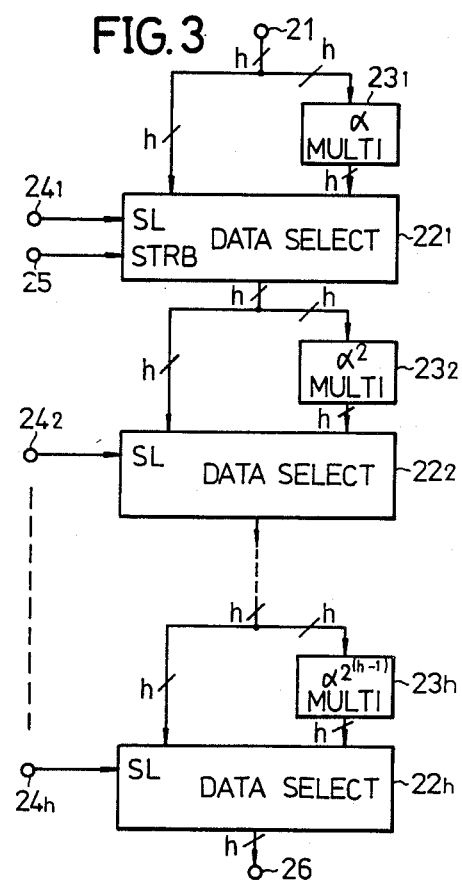

DIGITAL MULTIPLYING CIRCUIT

BACKGROUND OF THE INVENTION

The present invention generally relates to digital multiplying circuits, and more particularly to a digital multiplying circuit which multiples an arbitrary multiplying constant including zero to an h-bit vector which is an element of a finite field (Galois field) $GF(2^h)$ by use of multipliers and data selectors, where h is a natural number.

A digital multiplying circuit for multiplying an arbitrary multiplying constant to a digital data, is conventionally used for various purposes. For example, in the field of data transmission such as data communication, PCM recorder and digital and audio discs, an error correction code is used to correct a code error in the transmitted data and restore the transmitted data into the correct data. The digital multiplying circuit is used to generate a check vector which constitutes the error correction code. The error correction code comprises the check vector and the data which is to be transmitted, which data is a generating element of the check vector, and various kinds of error correction codes are conventionally known. Among the various error correction codes, the Reed Solomon code has superior correcting capability and redundancy (the proportion of the check vector with respect to the check vector and the data to be transmitted) of the transmitting information. A description will now be given with respect to a multiplying circuit in a Reed Solomon code generating circuit.

First, the conventional principle for generating the Reed Solomon code will be described. A code word (block) of the Reed Solomon code is described by the following row matrix (1), where $d_1$ through $d_m$ represent m h-bit data vectors which are to be transmitted, $P_0$ through $P_n$ represent n h-bit check vectors, and h, m, and n are natural numbers.

$$[d_1 d_2 \ldots d_m P_0 P_1 \ldots P_n] \quad (1)$$

In the Reed Solomon code defined in the finite field (Galois field) $GF(2^h)$, each of the above vectors is an element of the finite field $GF(2^h)$, and it is know that the following condition (2) must be satisfied among h, m, and n.

$$2^h - 1 \geq m + n + 1 \quad (2)$$

At the time of transmission (including recording), the check vectors $P_0$ through $P_n$ are added with respect to the data vectors $d_1$ through $d_m$. The check vectors $P_0$ through $P_n$ are generated so as to satisfy the following equation (3), where $\alpha$ represents a primitive element of the finite field $GF(2^h)$.

$$\begin{pmatrix} 1 & 1 & \ldots & 1 & 1 & \ldots & 1 \\ \alpha^{m+n} & \alpha^{m+n-1} & \ldots & \alpha^n & \alpha^{n-1} & \ldots & 1 \\ \alpha^{2\cdot(m+n)} & \alpha^{2\cdot(m+n-1)} & \ldots & \alpha^{2\cdot n} & \alpha^{2\cdot(n-1)} & \ldots & 1 \\ \cdot & \cdot & & \cdot & \cdot & & \cdot \\ \cdot & \cdot & & \cdot & \cdot & & \cdot \\ \cdot & \cdot & & \cdot & \cdot & & \cdot \\ \alpha^{n\cdot(m+n)} & \alpha^{n\cdot(m+n-1)} & \ldots & \alpha^{n\cdot n} & \alpha^{n\cdot(n-1)} & \ldots & 1 \end{pmatrix} \begin{pmatrix} d_1 \\ d_2 \\ d_3 \\ \cdot \\ \cdot \\ d_m \\ P_0 \\ \cdot \\ \cdot \\ P_n \end{pmatrix} = \begin{pmatrix} 0 \\ 0 \\ 0 \\ 0 \\ \cdot \\ \cdot \\ \cdot \\ 0 \end{pmatrix} \quad (3)$$

When the above equation (3) may be rewritten as the following equations (4), where the symbol "$\oplus$" represents an addition in the finite field $GF(2^h)$ and the symbol "$\odot$" represents a multiplication in the finite field $GF(2^h)$.

$$\begin{cases} d_1 \oplus d_2 \oplus \ldots \oplus d_m \oplus P_0 \oplus \ldots \oplus P_n = 0 \\ \alpha^{m+n} \odot d_1 \oplus \ldots \oplus \alpha^{n+1} \odot d_m \oplus \alpha^n \odot P_0 \oplus \ldots \oplus P_n = 0 \\ \cdot \\ \cdot \\ \alpha^{n\cdot(m+n)} \odot d_1 \oplus \ldots \oplus \alpha^{n\cdot(n+1)} \odot d_m \oplus \ldots \oplus P_n = 0 \end{cases} \quad (4)$$

A check matrix $H_0$ is a matrix of the (n+1)-th row and the (m+n+1)-th row in the left (upper) term of the equation (3), and may be described by the following equation (5).

$$H_0 = \begin{pmatrix} 1 & 1 & \ldots & 1 & 1 & \ldots & 1 & 1 \\ \alpha^{m+n} & \alpha^{m+n-1} & \ldots & \alpha^{n+1} & \alpha^n & \ldots & \alpha & 1 \\ \alpha^{2\cdot(m+n)} & \alpha^{2\cdot(m+n-1)} & \ldots & \alpha^{2\cdot(n+1)} & \alpha^{2\cdot n} & \ldots & \alpha^2 & 1 \\ \cdot & \cdot & & \cdot & \cdot & & \cdot & \cdot \\ \cdot & \cdot & & \cdot & \cdot & & \cdot & \cdot \\ \cdot & \cdot & & \cdot & \cdot & & \cdot & \cdot \\ \alpha^{n\cdot(m+n)} & \alpha^{n\cdot(m+n-1)} & \ldots & \alpha^{n\cdot(n+1)} & \alpha^{n\cdot n} & \ldots & \alpha^n & 1 \end{pmatrix} \quad (5)$$

The following check matrix $H_0'$ is obtained when an operation of adding a predetermined row of the matrix described by the equation (5) which predetermined row is multiplied by a certain constant and another predetermined row of the matrix which other predetermined row is multiplied by a certain constant, is performed several times.

$$H_0' = \begin{pmatrix} \beta_{0(m+n)} & \beta_{0(m+n-1)} & \beta_{0(n+1)} & 1 & 0 & 0 & \cdots & 0 \\ \beta_{1(m+n)} & \beta_{1(m+n-1)} & \beta_{1(n+1)} & 0 & 1 & 0 & \cdots & 0 \\ \cdot & \cdot & \cdot & & \cdot & \cdot & & \cdot \\ \cdot & \cdot & \cdot & & \cdot & \cdot & & \cdot \\ \cdot & \cdot & \cdot & & \cdot & \cdot & & \cdot \\ \beta_{n(m+n)} & \beta_{n(m+n-1)} & \beta_{n(n+1)} & 0 & 0 & 0 & \cdots & 1 \end{pmatrix} \quad (6)$$

Since $H_0'$ is also a check matrix, the following equation (7) stands.

$$H_0' \begin{pmatrix} d_1 \\ d_2 \\ \cdot \\ \cdot \\ d_m \\ P_0 \\ \cdot \\ \cdot \\ P_n \end{pmatrix} = \begin{pmatrix} 0 \\ 0 \\ \cdot \\ \cdot \\ \cdot \\ 0 \end{pmatrix} \quad (7)$$

From the equations (6) and (7), it is hence possible to obtain the check vectors $P_0$ through $P_n$.

$$\begin{cases} P_0 = \beta_{0(m+n)} \odot d_1 \oplus \cdots \oplus \beta_{0(n+1)} \odot d_m & - \quad (8-1) \\ P_1 = \beta_{1(m+n)} \odot d_1 \oplus \cdots \oplus \beta_{1(n+1)} \odot d_m & - \quad (8-2) \\ \cdot & \cdot \\ \cdot & \cdot \\ \cdot & \cdot \\ P_n = \beta_{n(m+n)} \odot d_1 \oplus \cdots \oplus \beta_{n(n+1)} \odot d_m & - \quad (8-n+1) \end{cases}$$

In the equations (8-1) through (8-n+1), $\beta_{0(m+n)}$ through $\beta_{n(n+1)}$ are m(n+1) constant vectors.

In the conventional Reed Solomon code generating circuit, the check vectors $P_0$ through $P_n$ are generated based on the equations (8-1) through (8-n+1). A digital multiplying circuit is provided within the conventional circuit in order to multiply the constant vectors $\beta_{0(m+n)}$ through $\beta_{n(n+1)}$ with the data vectors $d_1$ through $d_m$ in the equations (8-1) through (8-n+1). Conventionally, a first type of the digital multiplying circuit employs a read only memory (ROM) which pre-stores a table of m values obtained by multiplying $\beta_{k(m+n)}$ through $\beta_{k(n+1)}$ to corresponding arbitrary data vectors of the finite field GF($2^h$). A second type of the conventional digital multiplying circuit employs a first ROM which pre-stores a logarithmic table, an adding circuit, and a second ROM which pre-stores an antilogarithm table.

However, in order to pre-store the m values obtained by multiplying $\beta_{k(m+n)}$ through $\beta_{k(n+1)}$ to corresponding arbitrary data vectors of the finite field GF($2^h$), the ROM of the first type of digital multiplying circuit must have a large memory capacity. For example, in a case where h=8, m=28, and n=3, that is, in the case of a (32, 28) Reed Solomon code in the finite field GF($2^8$), it is necessary to provide four ROMs within the Reed Solomon code generating circuit because the check matrix $H_0'$ is a four row by thirty-two column matrix as may be seen from the equation (6) and each of the vectors which are elements of the finite field GF($2^8$) comprises eight bits. Each ROM is supplied with an 8-bit vector input and a 5-bit column control signal required for discriminating the thirty-two columns, and is designed to produce an 8-bit vector. Hence, each ROM must have a memory capacity of 65,536 (=8×$2^{13}$) bits. However, with the present integrated technology, it is difficult to manufacture a ROM having such a large memory capacity in the form of a large scale integrated (LSI) circuit with the present LSI technology, and the manufacturing cost of the LSI ROM circuit is extremely high.

On the other hand, the second type of digital multiplying circuit comprises two ROMs and an adding circuit as described before. In a case where h=8, the two ROMs are each constituted by 256×8 gates when the ROMs are manufactured in the form of LSI circuits. The adding circuit is constituted by approximately 200 gates when the adding circuit is manufactured in the form of an LSI circuit. Hence, it is also difficult to manufacture the second type of digital multiplying circuit in the form of an LSI circuit.

SUMMARY OF THE INVENTION

Accordingly, it is a general object of the present invention to provide a novel and useful digital multiplying circuit in which the problems described heretofore are eliminated.

Another and more specific object of the present invention is to provide a digital multiplying circuit in which h multiplying circuit parts each comprising a multiplier and a data selector are coupled in series, a multiplying constant of an r-th multiplying circuit path is selectively controlled to 1 or $\alpha^z$ by an external control signal, and vectors which are elements of the finite field GF($2^h$) are sequentially supplied as an input signal to a multiplying circuit part in the initial stage, where h is a natural number, $\alpha$ is a primitive element of a finite field GF($2^h$), z=2(r−1) and r=1, 2, ..., h. According to the digital multiplying circuit of the present invention, the digital multiplying circuit can be manufactured by an extremely small number of gates compared to the conventional digital multiplying circuit. Hence, the digital multiplying circuit of the present invention can be manufactured in the form of an LSI circuit by use of an extremely small number of gates, and the size and manufacturing cost of the LSI digital multiplying circuit can be reduced.

Still another object of the present invention is to provide a digital multiplying circuit in which at least one of the data selectors of the h multiplying circuit parts has such a terminal that an output vector (signal) of the data selector is forcibly made zero when an external control signal is applied to the terminal. According to the digital multiplying circuit of the present invention, it is possible to multiply zero to the input vector.

Other objects and further features of the present invention will be apparent from the following detailed description when read in conjunction with the accompanying drawings.

BRIEF DESCRIPTION OF THE DRAWINGS

FIG. 1 is a system block diagram showing an example of a conventional digital multiplying circuit;

FIG. 2 is a system block diagram showing an example of another conventional digital multiplying circuit;

FIG. 3 is a system block diagram showing an embodiment of a digital multiplying circuit according to the present invention;

DETAILED DESCRIPTION

Figure 4:
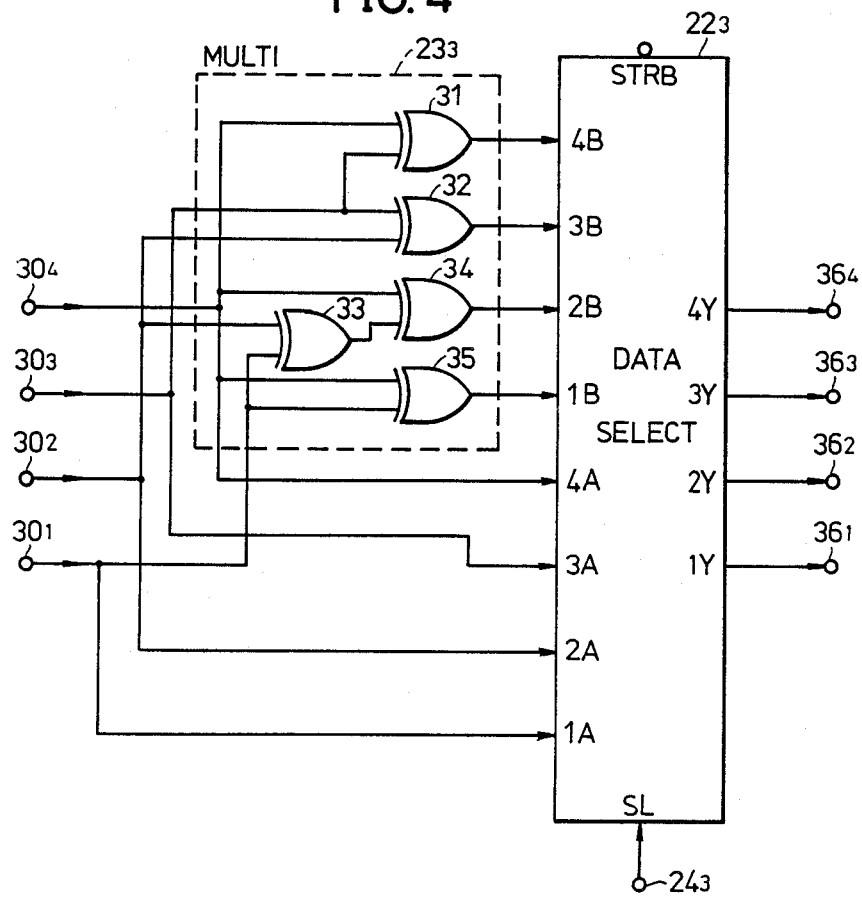
FIG. 4 is a system circuit diagram showing an embodiment of an essential part of the digital multiplying circuit according to the present invention.

First, a description will be given with respect to a conventional digital multiplying circuit by referring to FIG. 1. In FIG. 1, m h-bit data vectors $d_1$ through $d_m$ which are elements of a finite field $GF(2^h)$, are applied sequentially to an input terminal 11 and are supplied to a read only memory (ROM) 12. The ROM 12 pre-stores a table of m values (vectors) obtained by multiplying $\beta_{k(m+n)}$ through $\beta_{k(n+1)}$ to corresponding arbitrary data vectors of the finite field $GF(2^h)$, where k assumes one value out of 0, 1, 2, ..., n. n ROMs each having the same construction as the ROM 12 are provided in addition to the ROM 12 parallel within the Reed Solomon code generating circuit described before. The ROM 12 is designed to selectively and successively produce m vectors in the table responsive to a column control signal applied to an input terminal 13.

The constant vectors $\beta_{k(m+n)}$ through $\beta_{k(n+1)}$ in the equations (8-1) through (8—n+1) assume one of the values 0, 1 ($=\alpha^0$), $\alpha$, ..., $\alpha^{i-2}$, where $i=2^h$. Hence, an h-bit signal which is obtained by multiplying one value out of the constant vectors $\beta_{k(m+n)}$ through $\beta_{k(n+1)}$ by one value out of the data vectors $d_1$ through $d_m$ is obtained through an output terminal 14.

Another conventional digital multiplying circuit is shown in FIG. 2. In FIG. 2, the data vectors $d_1$ through $d_m$ are applied sequentially to an input terminal 15 and are supplied to a ROM 17 which pre-stores a logarithmic table. Exponential values corresponding to the input data vectors are read out from the ROM 17 and are supplied to an adding circuit 18. The adding circuit 18 performs a modulo-$(2^h-1)$ addition of the exponential values from the ROM 17 and h-bit exponential values applied to an input terminal 16. An h-bit output signal of the adding circuit 18 is supplied to a ROM 19 which pre-stores an antilogarithm table. An antilogarithm data corresponding to the h-bit signal supplied to the ROM 19, is read out from the ROM 19 and is obtained through an output terminal 20 as a product of the multiplication.

The exponential data applied to the input terminal 16 is selected to exponential values in accordance with the constant vectors $\beta_{k(m+n)}$ through $\beta_{k(n+1)}$. For example, in the case of a constant vector $\alpha^k$, a data indicating k is applied to the input terminal 16 and an h-bit multiplied signal described by $\alpha^k \odot d$ is obtained through the output terminal 20, where d is one vector out of the input data vectors $d_1$ through $d_m$.

However, the conventional digital multiplying circuits shown in FIGS. 1 and 2 suffer the various disadvantages described before.

Next, a description will be given with respect to an embodiment of the digital multiplying circuit according to the present invention in which the disadvantages of the conventional digital multiplying circuits are eliminated. In FIG. 3, intermediate operation vectors $Q_0$ through $Q_n$ are applied sequentially to an input terminal 21. A matrix $H_1$ described by the following equation (9) will be defined to explain the intermediate operation vectors $Q_0$ through $Q_n$.

$$H_1 = \begin{pmatrix} 1 & 1 & \cdots & 1 & 1 \\ \alpha^{m-1} & \alpha^{m-2} & \cdots & \alpha & 1 \\ \alpha^{2 \cdot (m-1)} & \alpha^{2 \cdot (m-2)} & \cdots & \alpha^2 & 1 \\ \cdot & \cdot & & \cdot & \cdot \\ \cdot & \cdot & & \cdot & \cdot \\ \cdot & \cdot & & \cdot & \cdot \\ \alpha^{n \cdot (m-1)} & \alpha^{n \cdot (m-2)} & \cdots & \alpha^n & 1 \end{pmatrix} \quad (9)$$

In the equation (9), $\alpha$ is a primitive element of the finite field $GF(2^h)$, as in the case of the equations (3) through (5) described before. The intermediate operation vectors $Q_0$ through $Q_n$ can be described by the following equation (10) by use of the (n+1) row by m column matrix $H_1$ and the data vectors $d_1$ through $d_m$.

$$\begin{pmatrix} Q_0 \\ Q_1 \\ Q_2 \\ \cdot \\ \cdot \\ \cdot \\ Q_n \end{pmatrix} = H_1 \odot \begin{pmatrix} d_1 \\ d_2 \\ d_3 \\ \cdot \\ \cdot \\ \cdot \\ d_m \end{pmatrix} \quad (10)$$

The following equation (11) can be obtained by rewriting the equation (10).

$$\begin{cases} Q_0 = d_1 \oplus d_2 \oplus \ldots \oplus d_m \\ Q_1 = \alpha^{m-1} \odot d_1 \oplus \alpha^{m-2} \odot d_2 \oplus \ldots \oplus d_m \\ \cdot \\ \cdot \\ \cdot \\ Q_n = \alpha^{n \cdot (m-1)} \odot d_1 \oplus \alpha^{n \cdot (m-2)} \odot d_2 \oplus \ldots \oplus d_m \end{cases} \quad (11)$$

When the equation (11) is compared with the equation (4) described before, it may be seen that the equation (11) performs a part of the operation (operation on only the data vectors $d_1$ through $d_m$) in the equation (4) and is obtained by dividing the first through n-th rows of the equation (4) by 1, $\alpha^{n+1}$, ..., $\alpha^{n(n+1)}$, respectively. Accordingly, the following equation (12) stands.

$$\begin{pmatrix} Q_0 \\ \alpha^{n+1} \odot Q_1 \\ \alpha^{2(n+1)} \odot Q_2 \\ \cdot \\ \cdot \\ \cdot \\ \alpha^{n(n+1)} \odot Q_n \end{pmatrix} \oplus \begin{pmatrix} 1 & 1 & \cdots & 1 \\ \alpha^n & \alpha^{n-1} & \cdots & 1 \\ \alpha^{2n} & \alpha^{2(n-1)} & \cdots & 1 \\ \cdot & \cdot & & \cdot \\ \cdot & \cdot & & \cdot \\ \cdot & \cdot & & \cdot \\ \alpha^{nn} & \alpha^{n(n-1)} & \cdots & 1 \end{pmatrix} \odot \begin{pmatrix} P_0 \\ P_1 \\ P_2 \\ \cdot \\ \cdot \\ \cdot \\ P_n \end{pmatrix} = \begin{pmatrix} 0 \\ 0 \\ 0 \\ \cdot \\ \cdot \\ \cdot \\ 0 \end{pmatrix} \quad (12)$$

The equation (12) is a (n+1)-element system of equations, and the following equation (13) can be obtained from the equation (12), where $-Q_0 = Q_0$, $-\alpha^{n+1} \odot Q_1 = \alpha^{n+1} \odot Q_1$, ..., $-\alpha^{n(n+1)} \odot Q_n = \alpha^{n(n+1)} \odot Q_n$.

$$\begin{cases} P_0 \oplus P_1 \oplus \ldots \oplus P_n = Q_0 \\ \alpha^n \odot P_0 \oplus \alpha^{n-1} \odot P_1 \oplus \ldots \oplus P_n = \alpha^{n+1} \odot Q_1 \\ \quad \vdots \qquad \qquad \vdots \\ \alpha^{n \cdot n} \odot P_0 \oplus \alpha^{n \cdot (n-1)} \odot P_1 \oplus \ldots \oplus P_n = \alpha^{n \cdot (n+1)} \odot Q_n \end{cases} \quad (13)$$

When the equation (13) is solved, the check vectors $P_0$ through $P_n$ are described by linear combinations of the intermediate operation vectors $Q_0$ through $Q_n$, and the following equations (14-1) through (14−n+1) are obtained.

$$\begin{cases} P_0 = a_{00} \odot Q_0 \oplus a_{01} \odot Q_1 \oplus \ldots \oplus a_{0n} \odot Q_n & - (14-1) \\ P_1 = a_{10} \odot Q_0 \oplus a_{11} \odot Q_1 \oplus \ldots \oplus a_{1n} \odot Q_n & - (14-2) \\ \quad \vdots \\ P_n = a_{n0} \odot Q_0 \oplus a_{n1} \odot Q_1 \oplus \ldots \oplus a_{nn} \odot Q_n & - (14-n+1) \end{cases}$$

The check vectors $P_0$ through $P_n$ can be calculated from the equations (14-1) through (14-n+1). In the present embodiment, a description will be given with respect to a multiplying circuit which performs multiplications of the intermediate operation vectors $Q_0$ through $Q_n$ and the $(n+1)^2$ constant vectors $a_{00}$ through $a_{nn}$.

The intermediate operation vectors $Q_0$ through $Q_n$ are applied sequentially to the input terminal 21. The intermediate operation vectors $Q_0$ through $Q_n$ are also elements of the finite field $GF(2^h)$. h multiplying circuit parts each comprising a data selector $22_r$ and a multiplier $23_r$ are coupled in series between the input terminal 21 and an output terminal 26, where $r = 1, 2, \ldots, h$. The data selectors $22_1$ through $22_h$ selectively produce an input vector or an output vector of the corresponding multipliers $23_1$ through $23_h$, responsive to a 1-bit external selection signal supplied to a select terminal SL of the data selectors $22_1$ through $22_h$ through corresponding input terminals $24_1$ through $24_h$. For example, the data selectors $22_1$ through $22_h$ selectively produce the input vector of the corresponding multipliers $23_1$ through $23_h$ when the external selection signal assumes a logic level "0" and selectively produce the output vectors of the corresponding multipliers $23_1$ through $23_h$ when the external selection signal assumes a logic level "1". The data selector $22_1$ in the initial stage comprises a strobe terminal STRB. For example, the value of the output signal of the data selector $22_1$ is forcibly made zero when a 1-bit control signal supplied to the strobe terminal STRB through an input terminal 25 assumes a logic level "0".

Among the multipliers $23_1$ through $23_h$, the r-th multiplier $23_r$ is designed to multiply $\alpha^z$ with respect to the input signal thereof, where $\alpha$ is a primitive element of the finite field $GF(2^h)$ and $z = 2^{(r-1)}$. Accordingly, depending on the value of the selection signal applied to the select terminal SL, the data selector $22_r$ selectively produces a vector obtained by not performing a multiplication with respect to the input vector (that is, a vector obtained by multiplying "1" to the input vector) or a vector obtained by multiplying $\alpha^z$ with respect to the input vector of the multiplier $23_r$.

The elements of the finite field $GF(2^h)$ can be described by $0, 1 (=\alpha^0), \alpha, \alpha^2, \ldots, \alpha^{i-2}$. Hence, the multiplication in the finite field $GF(2^h)$ is performed with one of $0, \alpha^0, \alpha, \alpha^2, \ldots, 60^{i-2}$, and it is unnecessary to perform a multiplication with $\alpha^{i-1}$ which is equal to 1. And, in the case where zero is multiplied in the present embodiment, a low-level signal is applied to the input terminal 25 so as to forcibly make the output vector of the data selector $22_1$ zero and hence multiply zero.

The data selector comprising the strobe terminal STRB is not limited to the data selector $22_1$. The strobe terminal STRB may be provided on one of the data selectors $22_2$ through $22_h$. Further, the strobe terminal STRB may be provided on two or more data selectors.

The constant vectors $a_{00}$ through $a_{nn}$ assume one of the values $0, 1, \alpha, \alpha^2, \ldots, \alpha^{i-2}$. In other words, the multiplying constant is obtained by the entire circuit shown in FIG. 3 by controlling the data selectors $22_1$ through $22_h$. For example, when it is assumed in the equation (14-1) that the constant vector $a_{00}$ is equal to $\alpha$, the constant vector $a_{01}$ is equal to $\alpha^3$, the constant vectors $a_{02}$ through $a_{0(n-1)}$ are respectively equal to 1, and the constant vector $a_{0n}$ is equal to $\alpha^2$, only the data selector $22_1$ is controlled to selectively produce the output vector of the multiplier $23_1$ when the intermediate operation vector $Q_0$ is applied to the input terminal 21. The remaining data selectors $22_2$ through $22_h$ are controlled to selectively produce the input vectors (output vectors of the data selectors $22_1$ through $22_{h-1}$) of the corresponding multipliers $23_2$ through $23_h$. As a result, a vector $\alpha \odot Q_0 (= a_{00} \odot Q_0)$ is obtained from the output terminal 26.

Next, when the intermediate operation vector $Q_1$ is applied to the input terminal 21, the data selectors $22_1$ and $22_2$ are controlled to selectively produce the output vectors of the corresponding multipliers $23_1$ and $23_2$. The remaining data selectors $22_3$ through $22_h$ are controlled to selectively produce the input vectors of the corresponding multipliers $23_3$ through $23_h$. Accordingly, the intermediate operation vector $Q_1$ applied to the input terminal 21 is multiplied by $\alpha$ and $\alpha^2$ in the respective multipliers $23_1$ and $23_2$, and a vector $\alpha^3 Q_1$ $(= a_{01} Q_1)$ is obtained from the output terminal 26. Thereafter, the intermediate vectors are applied to the input terminal 21 in the sequence $Q_2 \rightarrow Q_3 \rightarrow \ldots \rightarrow Q_{n-1}$. However, the constant vectors $a_{02}$ through $a_{0(n-1)}$ to which the intermediate operation vectors $Q_2$ through $Q_{n-1}$ are multiplied, are respectively equal to 1 as described before. Hence, the data selectors $22_1$ through $22_h$ are controlled to selectively produce the input vectors of the corresponding multipliers $23_1$ through $23_h$. Therefore, the intermediate operation vectors $Q_2$ through $Q_{n-1}$ successively pass through the data selectors $22_1$ through $22_h$ and are obtained unchanged from the output terminal 26.

Next, the intermediate operation vector $Q_n$ is applied to the input terminal 21, and only the data selector $22_2$ is controlled to selectively produce the output vector of the multiplier $23_2$. Thus, the intermediate operation vector $Q_n$ applied to the input terminal 21 successively passes through the data selector $22_1$, the multiplier $23_2$ and the data selectors $22_2$ through $22_h$, and is obtained from the output terminal 26. In other words, the intermediate operation vector $Q_n$ is converted into a vector $\alpha^2 \odot Q_n$ ($= a_{0n} \odot Q_n$) and is obtained from the output terminal 26.

Similarly, when multiplying the constant vectors $a_{10}$ through $a_{nn}$ with the intermediate operation vectors $Q_0$ through $Q_n$, the data selectors $22_1$ through $22_h$ are controlled depending on the value of each of the constant vectors so as to obtain the desired multiplication result. In a case where the constant vector is equal to zero, a vector of the value zero is obtained from the output terminal 26 because a low-level control signal is applied to the input terminal 25.

Next, a description will be given with respect to the construction of the multipliers $23_1$ through $23_h$. For example, it will be assumed that $h=4$. Further, 0, 1, $\alpha$, ..., $\alpha^{14}$ which are elements of the finite field $GF(2^4)$ will be defined as follows by use of a maximum pulse sequence of a fourth order primitive polynomial $g(x) = x^4 + x + 1$.

$$
\begin{aligned}
0 &= (0\ 0\ 0\ 0), & 1 &= \alpha^0 = (0\ 0\ 0\ 1) \\
\alpha &= (0\ 0\ 1\ 0), & \alpha^2 &= (0\ 1\ 0\ 0) \\
\alpha^3 &= (1\ 0\ 0\ 0), & \alpha^4 &= (0\ 0\ 1\ 1) \\
\alpha^5 &= (0\ 1\ 1\ 0), & \alpha^6 &= (1\ 1\ 0\ 0) \\
\alpha^7 &= (1\ 0\ 1\ 1), & \alpha^8 &= (0\ 1\ 0\ 1) \\
\alpha^9 &= (1\ 0\ 1\ 0), & \alpha^{10} &= (0\ 1\ 1\ 1) \\
\alpha^{11} &= (1\ 1\ 1\ 0), & \alpha^{12} &= (1\ 1\ 1\ 1) \\
\alpha^{13} &= (1\ 1\ 0\ 1), & \alpha^{14} &= (1\ 0\ 0\ 1)
\end{aligned}
$$

Generally, a multiplication in the finite field $GF(2^h)$ is described in the form of an h by h square matrix (15) in the finite field $GF(2)$, where an element of the finite field $GF(2^h)$ is an h-dimension vector of the finite field $GF(2)$.

$$
\begin{pmatrix}
b_{11} & \cdots & b_{1h} \\
\cdot & & \cdot \\
\cdot & & \cdot \\
\cdot & & \cdot \\
b_{h1} & \cdots & b_{hh}
\end{pmatrix}
\tag{15}
$$

In the matrix(15), $b_{11}$ through $b_{hh}$ each are one bit and assume the value "0" or "1". Accordingly, a multiplication in the finite field $GF(2^4)$ can be described by a 4 by 4 square matrix in the finite field $GF(2)$. Further, in the case where $h=4$, the multiplying constants of the multipliers $23_1$, $23_2$, $23_3$, and $23_4$ are $\alpha$, $\alpha^2$, $\alpha^4$, and $\alpha^8$, respectively. Thus, when the bits in the 4-bit input vector of the multiplier are designated by $x_4$, $X_3$, $x_2$, and $x_1$ from the most significant bit (MSB), a multiplication of $\alpha^4$ to the 4-bit input vector can be described by the following equation (16):

$$
\begin{pmatrix}
0010 \\
1001 \\
1100 \\
0100
\end{pmatrix}^2 \cdot
\begin{pmatrix}
x_4 \\
x_3 \\
x_2 \\
x_1
\end{pmatrix}
\tag{16}
$$

$$
= \begin{pmatrix}
1100 \\
0110 \\
1011 \\
1001
\end{pmatrix} \cdot
\begin{pmatrix}
x_4 \\
x_3 \\
x_2 \\
x_1
\end{pmatrix}
$$

$$
= \begin{pmatrix}
x_4 \oplus x_3 \\
x_3 \oplus x_2 \\
x_4 \oplus x_2 \oplus x_1 \\
x_4 \oplus x_1
\end{pmatrix}
$$

Accordingly, as shown in FIG. 4, the multiplier $23_3$ for multiplying $\alpha^4$ can be constituted by five 2-input exclusive-OR circuits 31 through 35. In FIG. 4, the bits in the 4-bit input vector are applied to respective input terminals $30_1$ through $30_4$ so that the least significant bit (LSB) is applied to the input terminal $30_1$ and the MSB is applied to the input terminal $30_4$.

As may be seen from the equation (16), the MSB of the 4-bit output signal of the multiplier $23_3$ can be described by $x_4 \oplus x_3$. The input terminals $30_4$ and $30_3$ are respectively coupled to input terminals of the exclusive-OR circuit 31, and the MSB of the output signal of the multiplier $23_3$ is obtained from the exclusive-OR circuit 31. The input terminals $30_3$ and $30_2$ are respectively coupled to input terminals of the exclusive-OR circuit 32. The input terminal $30_4$ is coupled to one input terminal of the exclusive-OR circuit 34 and to one input terminal of the exclusive-OR circuit 35. The input terminal $30_2$ is coupled to one input terminal of the exclusive-OR circuit 33. In addition, the input terminal $30_1$ is coupled to the other input terminal of the exclusive-OR circuit 33 and to the other input terminal of the exclusive-OR circuit 35. An output terminal of the exclusive-OR circuit 33 is coupled to the other input terminal of the exclusive-OR circuit 34. Accordingly, the output signals of the exclusive-OR circuits 31, 32, 34, and 35 are supplied to input terminals 4B, 3B, 2B, and 1B of the data selector $22_3$ as a vector which is multiplied with $\alpha^4$ as described by the matrix of the equation (16).

The bits in the 4-bit input vector are also supplied to respective input terminals 1A through 4A of the data selector $22_3$, through the input terminals $30_1$ through $30_4$. A known integrated circuit (IC) provided with a strobe terminal, such as 74LS157 manufactured by Texas Instruments of the United States, may be used for the data selector $22_3$ and the other data selectors $22_1$, $22_2$, and $22_4$. Bits in an output signal of the data selector $22_3$ are produced through terminals 1Y through 4Y and are obtained from output terminals $36_1$ through $36_4$.

Similarly, a multiplication of $\alpha$ to the 4-bit input vector can be described by the following equation (17).

$$
\alpha \cdot X = \begin{pmatrix}
0100 \\
0010 \\
1001 \\
1000
\end{pmatrix} \cdot
\begin{pmatrix}
x_4 \\
x_3 \\
x_2 \\
x_1
\end{pmatrix} = \begin{pmatrix}
x_3 \\
x_2 \\
x_4 \oplus x_1 \\
x_4
\end{pmatrix}
\tag{17}
$$

Figure 5A:
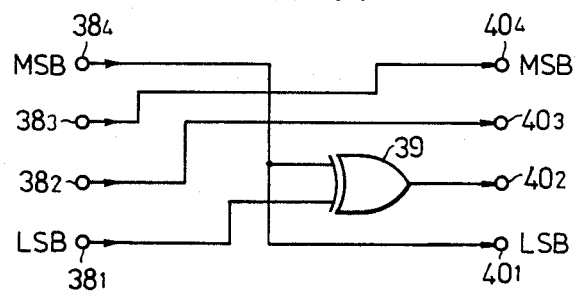
FIGS. 5A and 5B are circuit diagrams showing examples of multipliers which may be employed in the digital multiplying circuit according to the present invention.

Accordingly, the multiplier $23_1$ for multiplying $\alpha$ may be constructed as shown in FIG. 5A. In FIG. 5A, input terminals $38_3$, $38_2$ and $38_4$ are directly coupled to respective output terminals $40_4$, $40_3$, and $40_1$. On the other hand, input terminals $38_1$ and $38_4$ are coupled to an output terminal $40_2$ through an exclusive-OR circuit 39.

A multiplication of $\alpha^2$ to the 4-bit input vector can be described by the following equation (18).

$$\alpha^2 \cdot X = \begin{pmatrix} 0010 \\ 1001 \\ 1100 \\ 0100 \end{pmatrix} \cdot \begin{pmatrix} x_4 \\ x_3 \\ x_2 \\ x_1 \end{pmatrix} = \begin{pmatrix} x_2 \\ x_4 \oplus x_1 \\ x_4 \oplus x_3 \\ x_3 \end{pmatrix} \quad (18)$$

Figure 5B:
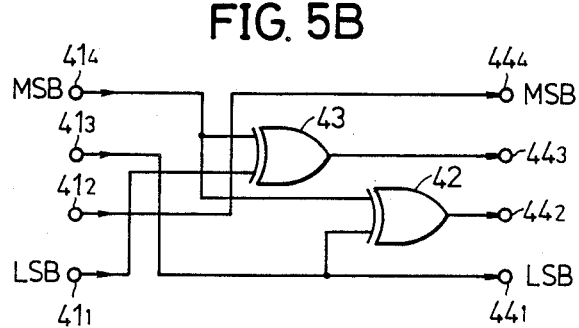

Thus, the multiplier $23_2$ for multiplying $\alpha^2$ may be constructed as shown in FIG. 5B. In FIG. 5B, an input terminal $41_2$ is directly coupled to an output terminal $44_4$. Input terminals $41_1$ and $44_4$ are respectively coupled to an output terminal $44_3$ through an exclusive-OR circuit 43. Input terminals $41_3$ and $41_4$ are coupled to an output terminal $44_2$ through an exclusive-OR circuit 42. Moreover, the input terminal $41_3$ is directly coupled to an output terminal $44_1$.

The multiplier $23_4$ for multiplying $\alpha^8$ to the 4-bit input vector can be constructed in a manner similar to the multipliers $23_1$ through $23_3$ described heretofore.

Next, a description will be given with respect to the number of gates required when the present embodiment of the digital multiplying circuit is to be manufactured in the form of a large scale integrated (LSI) circuit. The number of exclusive-OR circuits required for the multiplication in the finite field $GF(2^h)$, is equal to the number of "1"s minus 1 for each row in the equation (15) described before. Since the equation (15) is a regular matrix, there is at least one "1" in each row in the equation (15). Thus, for an average value of the multiplying constants which are likely to be used, there are $(h/2)+0.5$ "1"s for each row in the equation (15), and it is necessary to provide $(h/2)-0.5$ exclusive-OR circuits. Accordingly, the number of exclusive-OR circuits required to perform a multiplication in the finite field $GF(2^h)$ is $hx[(h/2)-0.5]$ in the average. However, the value $hx[(h/2)-0.5]$ is in the average, and the number of exclusive-OR circuits required to perform a multiplication in the finite field $GF(2^h)$ in the range of one which is the minimum and $hx(h-1)$ which is the maximum.

In the present embodiment, $hx[(h/2)-0.5]xh$ exclusive-OR circuits are required because h multipliers $23_1$ through $23_h$ are used. It is known that in an LSI circuit, an exclusive-OR circuit can be constituted by four gates, a memory can be constituted by one gate for one bit, and a data selector can be constituted by approximately three gates for one bit. Therefore, since the present embodiment of the digital multiplying circuit comprises h h-bit data selectors $22_1$ through $22_h$ and h multipliers $23_1$ through $23_h$, the digital multiplying circuit can be constituted by approximately $4h^2x[(h/2)-0.5[+3h^2$ gates. When generating the (32, 28) Reed Solomon code in the finite field $GF(2^8)$, for example, where $h=8$, $m=28$ and $n=3$, the digital multiplying circuit can be constituted by approximately 1088 gates.

The number of gates required in the present embodiment is considerably small compared to 65,536×4 gates required in the conventional circuit shown in FIG. 1 and the number of gates required in the conventional circuit shown in FIG. 2. Hence, the present embodiment of the digital multiplying circuit can easily be manufactured in the form of an LSI circuit with the present LSI technology.

The present invention is described heretofore with respect to the case where the digital multiplying circuit according to the present invention is applied to a multiplying circuit within a Reed Solomon code generating circuit. However, the digital multiplying circuit according to the present invention can be applied to a general multiplying circuit for processing a digital signal.

Further, the present invention is not limited to these embodiments, but various variations and modifications may be made without departing from the scope of the present invention.

What is claimed is:

1. A digital multiplying circuit comprising:
input terminal means sequentially applied with input vectors which are elements of a finite field $GF(2^h)$, where h is a natural number;
output terminal means for producing a signal obtained by multiplying a desired multiplying constant to one input vector; and
h multiplying circuit parts each comprising an input terminal, an output terminal, a multiplier and a data selector which has a first input terminal directly coupled to said input terminal of each multiplying circuit part, a second input terminal coupled through said multiplier to said input terminal of each multiplying circuit part, a selection terminal, and an output terminal utilized as said output terminal of each multiplying circuit part, thereby to selectively produce an input or output signal of said multiplier responsive to an external selection signal, said h multiplying circuit parts being coupled in series between said input terminal means and said output terminal means,
an r-th multiplier among the multipliers within said h multiplying circuit parts having a multiplying constant $\alpha^z$, where $r=1, 2, \ldots, h$, $\alpha$ is a primitive element of the finite field $GF(2^h)$ and $z=2^{(r-1)}$,
at least one of the data selectors within said h multiplying circuit parts comprising a control terminal, said at least one data selector being forced to produce a zero output signal responsive to an external control signal applied to said control terminal.

2. A digital multiplying circuit as claimed in claim 1 in which each of the multipliers within said h multiplying circuit parts is constituted by a predetermined number of 2-input exclusive-OR circuits, said predetermined number falling within a range from a minimum of one to a maximum of $hx(h-1)$.

3. A digital multiplying circuit as claimed in claim 1 in which said input terminal means is sequentially applied with intermediate operation vectors $Q_0$ through $Q_n$ which are obtained from the following equation by use of m h-bit data vectors $d_1$ through $d_m$ within a Reed Solomon code and a (n+1) row by m column matrix, $$\begin{pmatrix} Q_0 \\ Q_1 \\ Q_2 \\ \vdots \\ Q_n \end{pmatrix} = \begin{pmatrix} 1 & 1 & \cdots & 1 & 1 \\ \alpha^{m-1} & \alpha^{m-2} & \cdots & \alpha & 1 \\ \alpha^{2\cdot(m-1)} & \alpha^{2\cdot(m-2)} & \cdots & \alpha^2 & 1 \\ \vdots & \vdots & & \vdots & \vdots \\ \alpha^{n\cdot(m-1)} & \alpha^{n\cdot(m-2)} & \cdots & \alpha^n & 1 \end{pmatrix} \odot \begin{pmatrix} d_1 \\ d_2 \\ d_3 \\ \vdots \\ d_m \end{pmatrix}$$

said data vectors $d_1$ through $d_m$ being described by a row matrix $[d_1 d_2 \ldots d_m P_0 P_1 \ldots P_n]$, where $P_0$ through $P_n$ represent n h-bit check vectors, m and n are natural numbers and symbols "$\odot$" represent multiplications in the finite field $GF(2^h)$, and said h multiplying circuit parts as a whole successively multiply constant vectors $a_{00}$ through $a_{nn}$ in the following equation to each of said intermediate operation vectors $Q_0$ through $Q_n$, $$\begin{cases} P_0 = a_{00} \odot Q_0 \oplus a_{01} \odot Q_1 \oplus \cdots \oplus a_{0n} \odot Q_n \\ P_1 = a_{10} \odot Q_0 \oplus a_{11} \odot Q_1 \oplus \cdots \oplus a_{1n} \odot Q_n \\ \vdots \\ P_n = a_{n0} \odot Q_0 \oplus a_{n1} \odot Q_1 \oplus \cdots \oplus a_{nn} \odot Q_n \end{cases}$$

where symbols "$\oplus$" represent additions in the finite field $GF(2^h)$.

4. A digital multiplying circuit as claimed in claim 1 in which said at least one data selector comprising said control terminal is forced to produce a zero output signal responsive to said external control signal when said desired multiplying constant is equal to zero.

* * * * *

UNITED STATES PATENT AND TRADEMARK OFFICE
CERTIFICATE OF CORRECTION

PATENT NO. : 4,866,654
DATED : September 12, 1989
INVENTOR(S) : Yasuhiro YAMADA

It is certified that error appears in the above-identified patent and that said Letters Patent is hereby corrected as shown below:

Title page:

Item 73 - The correct name and address of the Assignee is:

VICTOR COMPANY OF JAPAN, LTD.

Yokohama, Japan

Signed and Sealed this

Second Day of March, 1993

*Attest:*

STEPHEN G. KUNIN

*Attesting Officer*  Acting Commissioner of Patents and Trademarks